(12) United States Patent
Morford (10) Patent No.: US 6,775,034 B1
(45) Date of Patent: Aug. 10, 2004

(54) PORTABLE SCANNING APPARATUS HAVING HIGH STORAGE CAPACITY

(75) Inventor: Chris L. Morford, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 727 days.

(21) Appl. No.: 09/689,201

(22) Filed: Oct. 11, 2000

(51) Int. Cl.[7] .......................... H04N 1/024; H04N 1/40; H04N 1/04; H04N 1/36

(52) U.S. Cl. ....................... 358/473; 358/471; 358/474; 358/424

(58) Field of Search ................................ 358/473, 471, 358/474, 424

(56) References Cited

U.S. PATENT DOCUMENTS

| | | | |
|---|---|---|---|
| 4,196,450 A | | 4/1980 | Miller et al. |
| 4,438,459 A | | 3/1984 | Levine |
| 4,588,282 A | | 5/1986 | Levine |
| 4,641,355 A | | 2/1987 | Hongo et al. |
| 4,947,261 A | * | 8/1990 | Ishikawa et al. ............. 358/473 |
| 5,107,100 A | | 4/1992 | Shepard et al. |
| 5,225,996 A | | 7/1993 | Weber |
| 5,294,781 A | | 3/1994 | Takahashi et al. |
| 5,330,173 A | | 7/1994 | Wensink et al. |
| 5,335,170 A | | 8/1994 | Petteruti et al. |
| 5,383,112 A | | 1/1995 | Clark |
| 5,397,882 A | | 3/1995 | Van Solt |
| 5,557,596 A | * | 9/1996 | Gibson et al. ............... 369/101 |
| 5,574,804 A | | 11/1996 | Olschafskie et al. |
| 5,883,375 A | | 3/1999 | Knowles et al. |
| 5,907,148 A | | 5/1999 | Iwafuchi et al. |
| 6,064,779 A | * | 5/2000 | Neukermans et al. ........ 382/313 |
| 6,467,688 B1 | * | 10/2002 | Goldman et al. ...... 235/472.01 |
| 2002/0118175 A1 | * | 8/2002 | Liebenow et al. ........... 345/168 |
| 2002/0125324 A1 | * | 9/2002 | Yavid et al. ........... 235/462.45 |

* cited by examiner

Primary Examiner—Edward Coles
Assistant Examiner—Houshang Safaipour (57) ABSTRACT

A portable apparatus for replicating images is disclosed. The portable apparatus includes an indicia-detecting component positioned within a housing which generates a light beam directed along a light path toward the images. The indicia-detecting component also receives reflected light from the images to produce electric signals representative of the images. An atomic resolution storage device positioned within the housing is electrically coupled to the indicia-detecting component and is capable of receiving the electrical signals representative of the image and storing information regarding the images.

23 Claims, 8 Drawing Sheets

PORTABLE SCANNING APPARATUS HAVING HIGH STORAGE CAPACITY

THE FIELD OF THE INVENTION

The present invention generally relates to a portable scanning apparatus, and more particularly to a portable scanning apparatus capable of independently storing a large amount of data which can be transferred to a microprocessor or computer.

BACKGROUND OF THE INVENTION

Conventional non-portable scanners used for scanning various indicia such as alpha numeric (i.e. text including letters and numbers) and non-alpha numeric (drawings, sketches or non-textual) images are known in the art. Depending on the quality of a scanner, the scanner may replicate simple to detailed documents, including pictorial images. However, conventional non-portable scanners do not include a memory component or include a limited memory component incapable of storing even minimal scanned-in data. In order to edit or manipulate scanned-in indicia, the scanner must be electrically coupled to a microprocessor, such as a computer, via an electrical connection, such as a cable connection.

In a normal setting, a conventional non-portable scanner is positioned adjacent a host computer such that the scanner is electrically coupled to the computer via a cable connection. Once the scanner scans in the desired indicia, the user utilizes the computer to download the scanned in version of the indicia to the computer, where it can be saved in its present format, manipulated, saved in the manipulated format, or printed. Additional information may be incorporated into the scanned-in indicia via a keypad or control buttons associated with the scanner.

Conventional portable scanners or hand-held scanners are also known in the art. Portable scanners are physically controlled by a user's hand and are often much less expensive than a non-portable scanner. Portable scanners provide greater flexibility than non-portable scanners with respect to reproducing indicia that cannot be passed through or positioned on a non-portable scanner. For example, physical items that are not part of a physical paper document may be scanned in via a portable scanner. Further, physical items that are incorporated into a larger structure, such as a book, or are secured to a larger structure, such as a wall or a shelf, may be scanned in via certain portable scanner. Like non-portable scanners, some portable scanners permit additional information to be incorporated into the scanned-in indicia or items via a keypad or control buttons associated with the scanner.

While conventional portable scanners provide greater flexibility in replicating desired indicia or items, conventional portable scanners must be physically connected to a host computer or network. Conventional portable scanners do not include a limited memory component incapable of storing even minimal scanned-in data. In most instances, conventional portable scanners are electrically coupled to a host computer or network via a cable connection. Therefore, even portable scanners known in the art are not truly portable in that they must be physically connected to a host computer or network via a cable connection, and thus suffer from the physical limitations of proximity to the host computer.

There is a continuing need for a truly portable scanner that is capable of self-storing scanned-in indicia or items. The stored indicia or items may then later be downloaded to a host computer or network at a convenient time. The portable scanning device should include a memory component capable of storing a substantial amount of information such that frequent downloading is not necessary.

SUMMARY OF THE INVENTION

The present invention is a portable scanning device for replicating images, such as indicia or items, and for self-storing the images. The portable scanning device includes a housing and an indicia-detecting component positioned within the housing. The indicia-detecting component generates a light beam directed along a light path towards the images to be replicated and receives reflected light from the image to be replicated. The indicia-detecting component produces electric signals representative of the image to be replicated. The portable scanning device further includes an atomic resolution storage device positioned within the housing and electrically coupled to the indicia-detecting component. The atomic resolution storage device is capable of storing a large volume of information regarding the images.

In one embodiment, the portable scanning device includes a microprocessor electrically coupled to the indicia-detecting component and to the atomic resolution storage device for manipulating information regarding the images. In another embodiment, a controller is electrically coupled to the indicia-detecting component and the atomic resolution storage device.

In another embodiment, the portable scanning device further includes a keyboard electrically coupled to the indicia-detecting component and to the atomic resolution storage device which both enables manual data entry and controls the indicia-detecting component. In another embodiment, the portable scanning device includes a display disposed on the housing for displaying information. In yet another embodiment, the portable scanning device includes a microprocessor electrically coupled to the indicia-detecting component, the keyboard, the display, and/or the atomic resolution storage device. In yet a further embodiment, the portable scanning device includes an input/output port electrically coupled to the storage device adapted to interconnect the portable scanning apparatus to an exterior microprocessor, such as a computer.

In another embodiment, the atomic resolution storage device includes a field emitter and a storage medium. The field emitter is fabricated by semiconductor microfabrication techniques capable of generating an electron beam current. The storage medium is in proximity to the field emitter and includes a storage area in one of a plurality of states to represent the information stored in the storage area.

DESCRIPTION OF THE PREFERRED EMBODIMENTS

In the following detailed description of the preferred embodiments, reference is made to the accompanying drawings that form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is a portable scanning device for replicating indicia or images. The portable scanning device is capable of storing a large amount of information such that an electrical connection between the portable scanning device and an external microprocessor or computer is not necessary during the scanning process. Rather, a truly portable scanning device is achieved in which an electrical connection between an external microprocessor or computer is only necessary to download the information to the microprocessor or computer for further use. The actual scanning process can take place at any location in which the information to be replicated is located. Access to a computer during the scanning process is not necessary.

Figure 1:
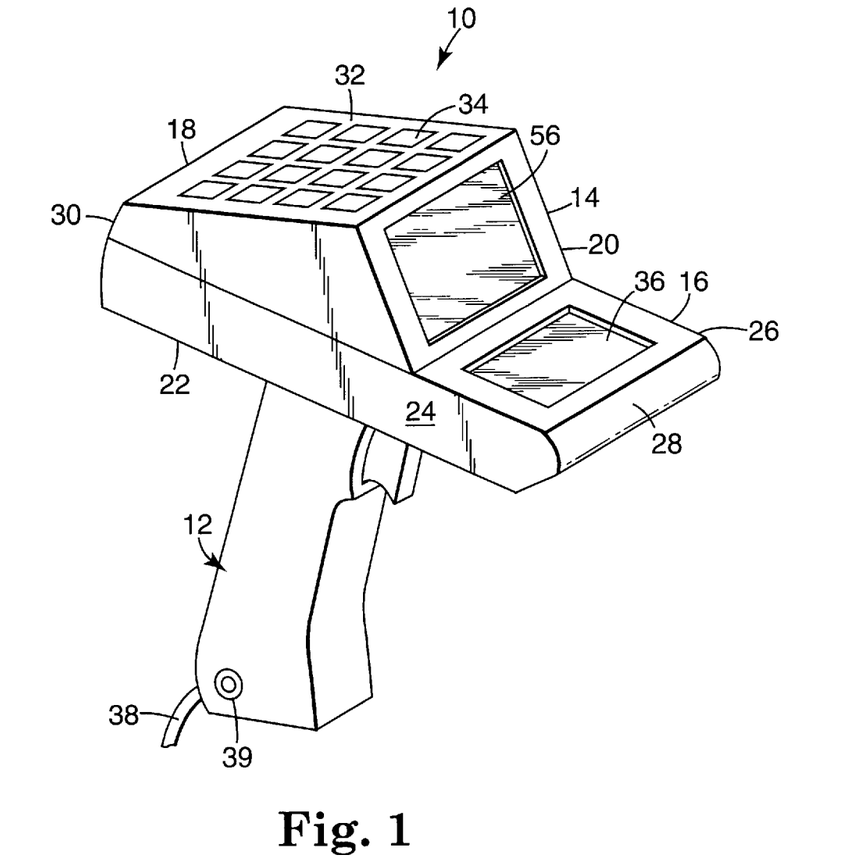
FIG. 1 is a perspective view of one embodiment of a portable scanning device in accordance with the present invention.

FIG. 1 is a perspective view of one embodiment of a portable scanning device in accordance with the present invention. As shown in FIG. 1, portable scanning device 10 includes a generally gun-shaped housing having handle portion 12 and elongated, narrow-bodied barrel or body portion 14. Handle portion 12 has a cross-sectional dimension and overall size such that it can conveniently fit in the palm of a user's hand. Both handle portion 12 and body portion 14 may be constructed from a lightweight, resilient, shock resistant, self-supporting material.

Body portion 14 is generally horizontally elongated along a longitudinal axis, and has front region 16 at the front end, rear region 18 at the rear end, and intermediate body region 20 between front and rear regions 16 and 18. Body portion 14 has bottom wall 22, a pair of opposite sidewalls 24 and 26 spaced transversely apart of each other by a predetermined width, front wall or nose 28, and rear wall 30 spaced rearwardly of front wall 28. Keyboard 32, having multiple manual depressible keys 34, is mounted on rear region 18 and is readily accessible to a user. Keys 34 may include a plurality of alphanumeric keys and a set of control function keys. As shown in FIG. 1, keys 34 are preferably arranged in parallel rows and columns. In one preferred embodiment, programmable function keys are also provided for user customization.

Display 36 having an area screen is mounted on front region 16. In one preferred embodiment, display 36 may be a low power liquid crystal display screen. Display 40 may display various lines of data and may be backlit for clarity and ease of reading. Cable 38 is a detachable electrical cable for permitting information transfer between portable scanning device 10 and an external host computer. In one embodiment, cable 38 represents a serial cable connection. It is understood that cable 38 is a detachable connection and is only required during the transfer of information between portable scanning device 10 and an exterior source, such as a computer or microprocessor. Cable 38 is not required during a scanning event. Power outlet port 39 may be utilized to couple an external power supply to portable scanning device 10.

Figure 2:
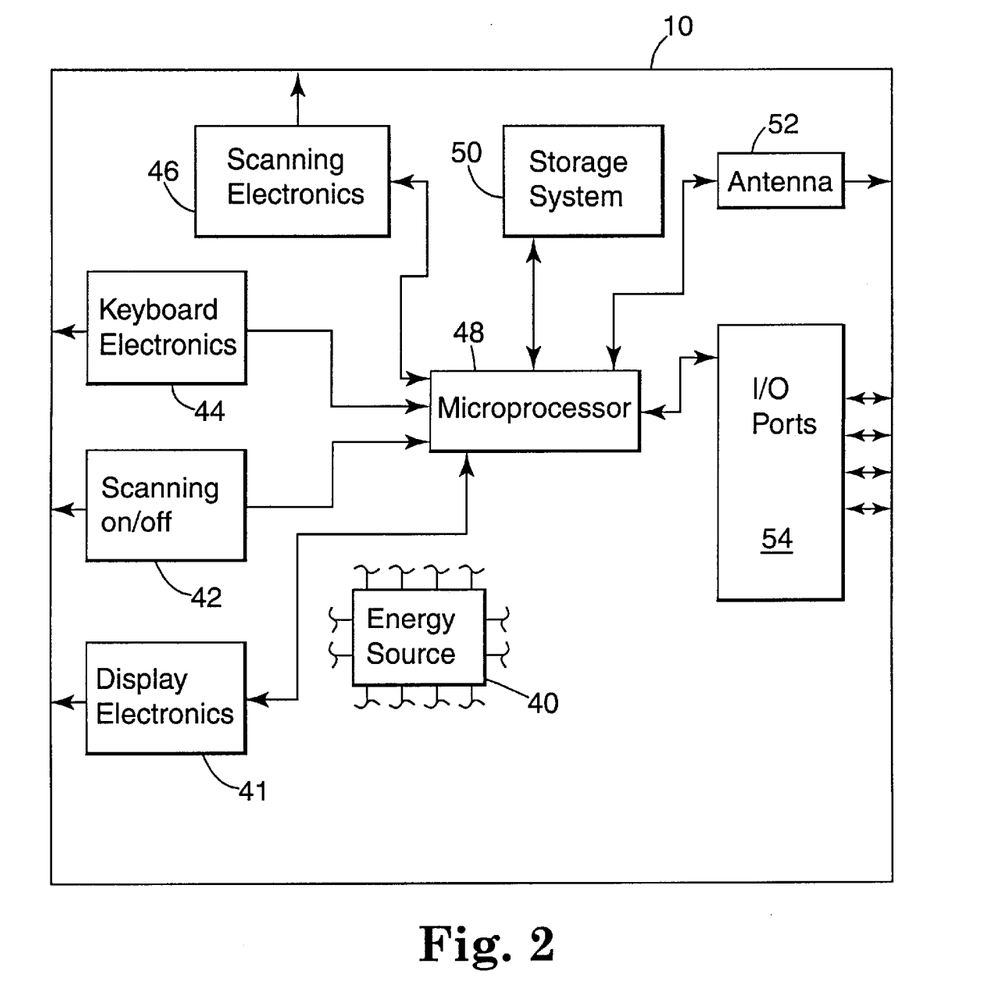
FIG. 2 is a block diagram including various electrical components of one embodiment of a portable scanning device in accordance with the present invention.

FIG. 2 is a block diagram including various electrical components of one embodiment of portable scanning device 10 in accordance with the present invention. Portable scanning device 10 includes energy source 40, display electronics 41, scanning on/off electronics 42, keyboard electronics 44, scanning electronics 46, microprocessor 48, storage system 50, antenna 52 and input/output ports 54.

Energy source 40 may be any type of energy source known in the art. For example, energy source 40 may be any type of direct current or alternating current power supply. Energy source 40 may be electrically coupled to all other subcomponents of portable scanning device 10. However, for clarity purposes, these interconnections are not shown in FIG. 2. Display electronics 41 interconnects display 36 to microprocessor 48. Scanning on/off electronics 42 interconnects an on/off key to microprocessor 48. An on/off key may be incorporated as one of keys 34, shown in FIG. 1. Keyboard electronics 44 interconnect keys 34 of keyboard 32 to microprocessor 48.

Scanning electronics 46 constitutes an indicia-detecting component which provides the ability of portable scanning device 10 to scan desired indicia or items. Scanning electronics 46 is electrically coupled to microprocessor 48. Scanning electronics 46 represents any number of specific scanning electronics known in the art. For example, in one embodiment, a laser light source, such as a semiconductor laser diode, is operative for generating an incident laser light beam, and for directing the incident laser light beam through an optical train and a light reflecting mirror. The mirror is positioned in the light path of the incident beam to direct the incident beam through light-transmissive window 56, shown in FIG. 1, mounted on body region 20. The incident beam is further directed over front region 16 and display 36 to the indicia to be replicated.

Light reflected off of the indicia travels outside of and past front region 16 and display 36 and passes through light transmissive window 56 for impingement on a scanning mirror. A sensor mirror is positioned in the light path of the reflected light such that the reflected symbol travels rearwardly towards a sensor lens and in turn, to a light sensor. The above-described design constitutes a retro-reflective-type scan head. The sensor, preferably a photo diode, detects the variable intensity of the collected laser light over a field of view which extends along, and preferably beyond, the indicia, and generates an electrical analog signal indicative of the detected variable light intensity. The electrical analog signal can be provided to microprocessor 48.

In the embodiment shown in FIG. 2, microprocessor 48 is capable of receiving, manipulating, and forwarding various information regarding and relating to scanned-in indicia to storage system 50 or directly to an external source, such as a computer or network. In one embodiment, storage system 50 is an atomic resolution storage system as is described with reference to FIGS. 3-6. Antenna 52 and input/output ports 54 are two-way conduits for providing information between microprocessor 48 and/or storage system 52 to an external source, such as an external microprocessor or computer. Information relating to scanned indicia may be transmitted via antenna 52 by radio frequency or infrared means, or via input/output ports 54 via an electrical cable connection.

FIGS. 3 through 6 disclose one embodiment of an atomic resolution storage device capable of storing megabytes to gigabytes of information in a small storage area. For a further discussion of an atomic resolution storage device, see U.S. Pat. No. 5,557,596, entitled, "Ultra-High Density Storage Device", by Gibson et al. and assigned to Hewlett-Packard Company, which is hereby incorporated by reference.

Figure 3:
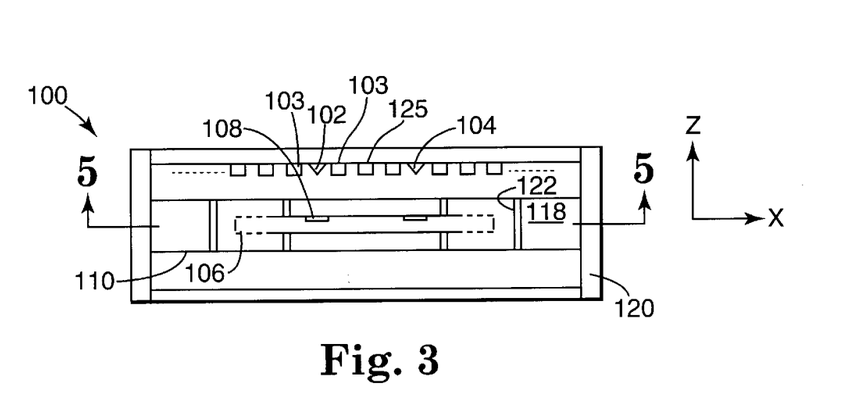
FIG. 3 illustrates a side view of one embodiment of a storage device in accordance with the present invention.

FIG. 3 illustrates a side cross-sectional view of storage device 100. Storage device 100 is one embodiment of storage system 50, shown in FIG. 2. Storage device 100 includes a number of field emitters, such as field emitters 102 and 104, storage medium 106 including a number of storage areas, such as storage area 108, and micromover 110. Micromover 110 scans storage medium 106 with respect to the field emitters or vice versa. In one preferred embodiment, each storage area is responsible for storing one bit of information.

In one embodiment, the field emitters are point emitters having relatively very sharp points. Each point emitter may have a radius of curvature in the range of approximately 1 nanometer to hundreds of nanometers. During operation, a pre-selected potential difference is applied between a field emitter and its corresponding gate, such as between field emitter 102 and gate 103 surrounding it. Due to the sharp point of the emitter, an electron beam current is extracted from the emitter towards the storage area. Depending on the distance between the emitters and the storage medium 106, the type of emitters, and the spot size (bit size) required, electron optics may be utilized to focus the electron beams. A voltage may also be applied to the storage medium 106 to either accelerate or decelerate the field-emitted electrons or to aid in focusing the field-emitted electrons.

In one embodiment, casing 120 maintains storage medium 106 in a partial vacuum, such as at least $10^{-5}$ torr. It is known in the art to fabricate such types of microfabricated field emitters in vacuum cavities using semiconductor processing techniques.

In the embodiment shown in FIG. 3, each field emitter has a corresponding storage area. In another embodiment, each field emitter is responsible for a number of storage areas. As micromover 110 scans storage medium 106 to different locations, each emitter is positioned above different storage areas. With micromover 110, an array of field emitters can scan over storage medium 106.

As will be described, the field emitters are responsible to read and write information on the storage areas by means of the electron beams they produce. Thus, field emitters suitable for use in storage device 100 are the type that can produce electron beams that are narrow enough to achieve the desired bit density on the storage medium, and can provide the power density of the beam current needed for reading from and writing to the medium. A variety of ways are known in the art that are suitable to make such field emitters.

In one embodiment, there can be a two-dimensional array of emitters, such as 100 by 100 emitters, with an emitter pitch of 50 micrometers in both the X and the Y directions. Each emitter may access bits in tens of thousands to hundreds of millions of storage areas. For example, the emitters scan over the storage areas with a periodicity of about 1 to 100 nanometers between any two storage areas. Also, all of the emitters may be addressed simultaneously or in a multiplexed manner. Such a parallel accessing scheme significantly reduces access time, and increases data rate of the storage device.

Figure 4:
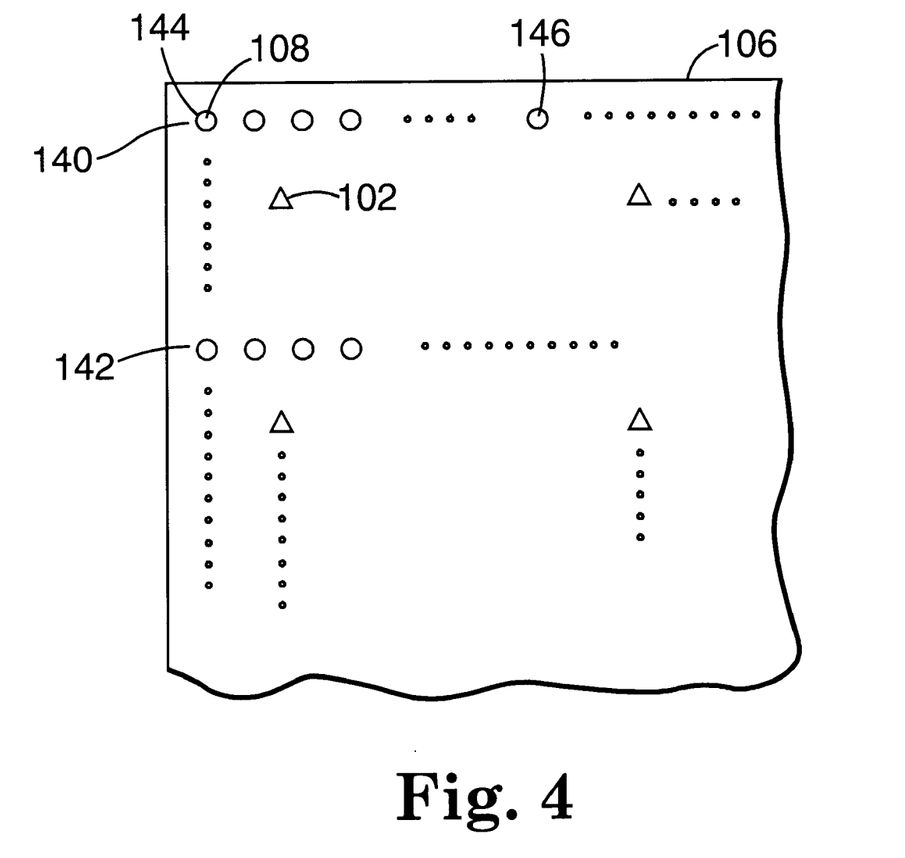
FIG. 4 is a simplified schematic diagram illustrating one embodiment of a storage device in accordance with the present invention.

FIG. 4 shows the top view of storage medium 100 having a two-dimensional array of storage areas and a two-dimensional array of emitters. Addressing the storage areas requires external circuits. One embodiment to reduce the number of external circuits is to separate the storage medium into rows, such as rows 140 and 142, where each row contains a number of storage areas. Each emitter is responsible for a number of rows. However, in this embodiment, each emitter is not responsible for the entire length of the rows. For example, emitter 102 is responsible for the storage areas within rows 140 through 142, and within columns 144 through 146. All rows of storage areas accessed by one emitter are connected to one external circuit. To address a storage area, one activates the emitter responsible for that storage area and moves that emitter by micromover 110 (shown in FIG. 3) to that storage area. The external circuit connected to the rows of storage areas within which that storage area lies is activated.

Micromover 110 can also be made in a variety of ways, as long as it has sufficient range and resolution to position the field emitters over the storage areas. As a conceptual example, micromover 110 is fabricated by standard semiconductor microfabrication process to scan storage medium 106 in the X and Y directions with respect to casing 120.

Figure 5:
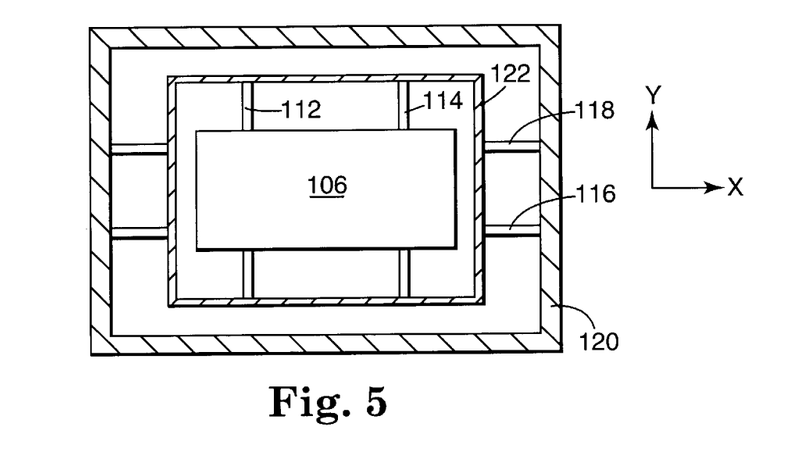
FIG. 5 is a top view of one embodiment of the storage device in accordance with the present invention as shown from lines 5—5 of FIG. 3.

FIG. 5 shows the top view of the cross section 5—5 in FIG. 3, illustrating storage medium 106 held by two sets of thin-walled microfabricated beams. The faces of the first set of thin-walled beams are in the Y-Z plane, such as 112 and 114. Thin-walled beams 112 and 114 may be flexed in the X direction allowing storage medium 106 to move in the X direction with respect to casing 120. The faces of the second set of thin-walled beams are in the X-Z plane, such as 116 and 118. Thin-walled beams 116 and 118 allow storage medium 106 to move in the Y direction with respect to casing 120. Storage medium 106 is held by the first set of beams, which are connected to frame 122. Frame 122 is held by the second set of beams, which are connected to casing 120. The field emitters scan over storage medium 106, or storage medium 106 scans over the field emitters in the X-Y directions by electrostatic, electromagnetic, piezoelectric, or other means known in the art. In this example, micromover 110 moves storage medium 106 relative to the field emitters.

In another embodiment, the electron beam currents are restored over the surface of storage medium 106 by either electrostatically or electromagnetically deflecting them, such as by electrostatic deflectors or electrodes 125 (shown in FIG. 3) positioned adjacent to emitter 104. Many different approaches to deflect electron beams can be found in literature on Scanning Electron Microscopy and will not be further described in this specification.

In one method, writing is accomplished by temporarily increasing the power density of the electron beam current to modify the surface state of the storage area. Reading is accomplished by observing the effect of the storage area on the electron beams, or the effect of the electron beams on the storage area. For example, a storage area that has been modified can represent a bit 1, and a storage area that has not been modified can represent a bit 0, and vice versa. In fact, the storage area can be modified to different degrees to represent more than two bits. Some modifications may be permanent, and some modifications may be reversible. The permanently modified storage medium is suitable for write-once-read-many memory (WORM).

In one embodiment, the basic idea is to alter the structure of the storage area in such a way as to vary its secondary electron emission coefficient (SEEC), its back-scattered electron coefficient (BEC), or the collection efficiency for secondary or back-scattered electrons emanating from the storage area. The SEEC is defined as the number of secondary electrons generated from the medium for each electron incident onto the surface of the medium. The BEC is defined as the fraction of the incident electrons that are scattered back from the medium. The collection efficiency for secondary/back-scattered electrons is the fraction of the secondary/back-scattered electrons that is collected by an electron collector, typically registered in the form of a current.

Reading is typically accomplished by collecting the secondary and/or back-scattered electrons when an electron beam with a lower power density is applied to storage medium 106. During reading, the power density of the electron beam should be kept low enough so that no further writing occurs.

One embodiment of storage medium 106 includes a material whose structural state can be changed from crystalline to amorphous by electron beams. The amorphous state has a different SEEC and BEC than the crystalline state, which leads to a different number of secondary and back-scattered electrons emitted from the storage area. By measuring the number of secondary and back-scattered electrons, one can determine the stage of the storage area. To change from the amorphous to crystalline state, one increases the beam power density and then slowly decreases it. This heats up the amorphous and then slowly cools it so that the area has time to anneal into its crystalline state. To change from crystalline to amorphous state, one increases the beam power density to a high level and then rapidly decreases the beam power. To read from the storage medium, a lower-energy beam strikes the storage area. An example of such type of material is germanium telluride (GeTe) and ternary alloys based on GeTe.

There are many preferred ways to induce a state change in storage medium 106. For example, a change in the topography of the medium, such as a hole or bump, will modify the SEEC and BEC of the storage medium. This modification occurs because the coefficients typically depend on the incident angle of the electron beam onto the storage area. Changes in material properties, band structure, and crystallography may also affect the coefficients. Also, the BEC depends on an atomic number, Z. Thus, one preferred storage medium has a layer of low Z material on top of a layer of high Z material or vice versa, with writing accomplished through ablating some of the top layer by an electron beam.

Figure 6:
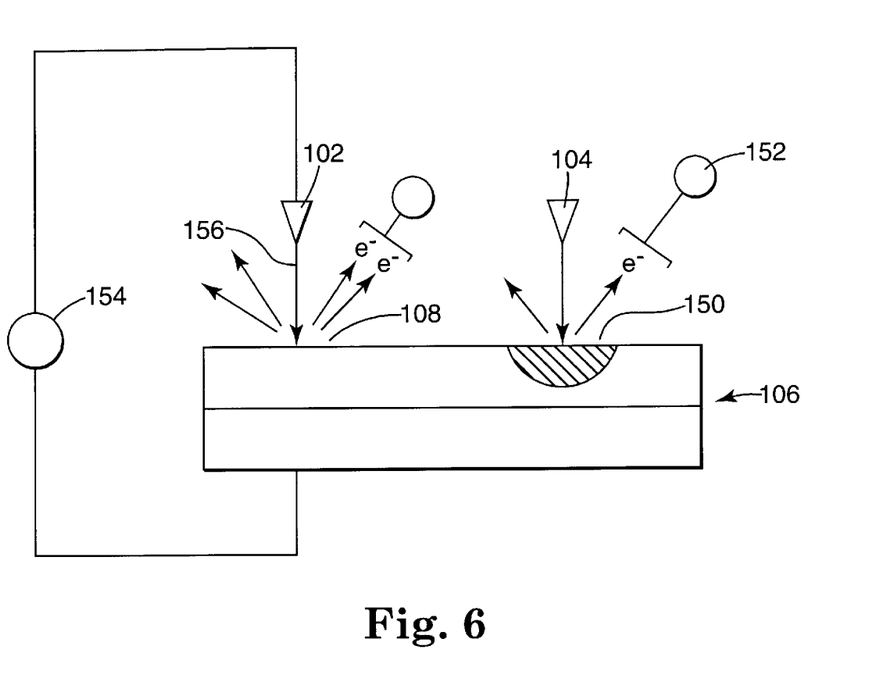
FIG. 6 is a diagram illustrating field emitters reading from storage areas of one embodiment of a storage device in accordance with the present invention.

FIG. 6 shows schematically the field emitters reading from storage medium 106. The state of storage area 150 has been altered, while the state of storage area 108 has not been altered. When electrons bombard a storage area, both secondary electrons and back-scattered electrons will be collected by the electron collectors, such as electron collector 152. An area that has been modified will produce a different number of secondary electrons and back-scattered electrons, as compared to an area that has not been modified. The difference may be more or may be less depending on the type of material and the type of modification. By monitoring the magnitude of the signal current collected by electron collectors 152, one can identify the state of and, in turn, the bit stored in, the storage area.

Field emitters may be noisy with the magnitude of the electron beam current varying with respect to time. Moreover, the gap distance between the tips of the emitters and the surface of the storage medium may vary. If the information stored were based on tunneling current, then the gap distance may be extremely crucial. However, the application presently disclosed depends on field emitters, and not directly on the emitted electron beam current, but rather on the effect of the beam. At least two ways may be used to alleviate the problem of the emitters being noisy. One way is to connect constant current source 154 to field emitter 102. This source will control the power density of electron beam current beam 156. Although this method will not storage techniques using the magnitude of the field emitted current as the signal, this method reduces the field emitter noise significantly. Another way to alleviate the field-emitter noise is to separately measure the emitted electron beam current and use it to normalize the signal current. As the electron beam current varies, the signal current varies correspondingly. On the other hand, the normalized signal current remains the same to indicate the state of the storage area.

Figure 7:
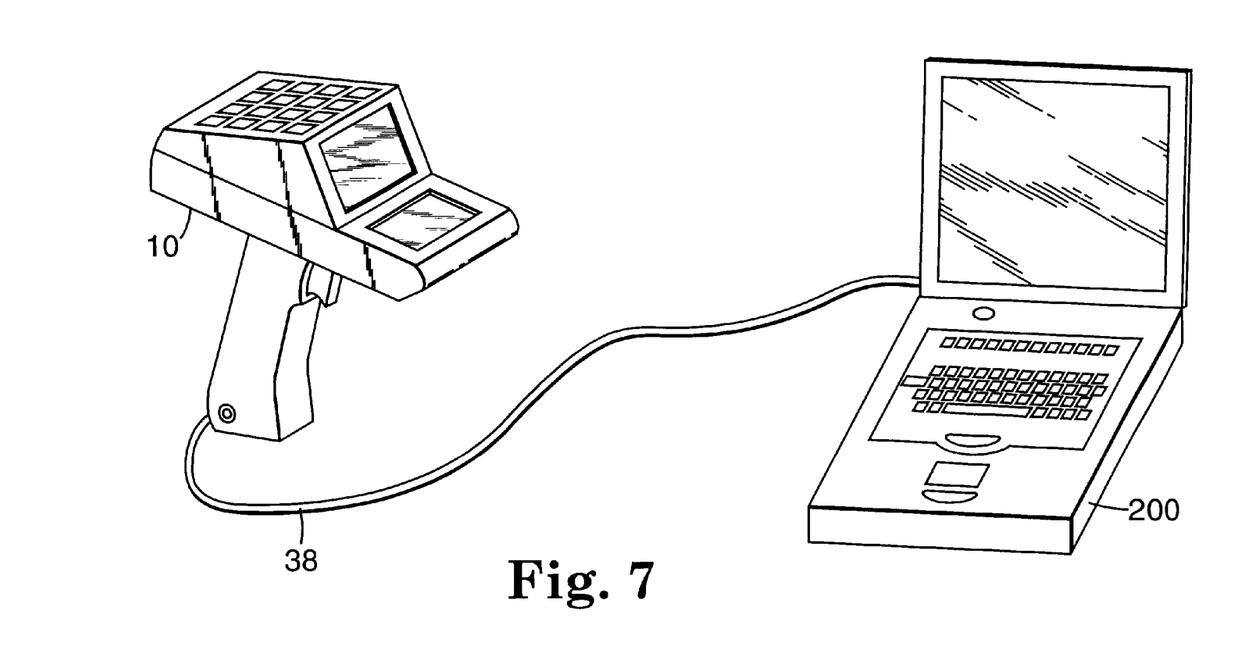
FIG. 7 is a perspective view of a portable scanner electrically coupled to a host computer in accordance with the present invention.

FIG. 7 is a perspective view illustrating portable scanning device 10 electrically coupled to computer 200 via cable connection 38. Cable connection 38 is configured to be adapted to interconnect with both portable scanning device 10 and computer 200. In one preferred embodiment, cable connection 38 is a serial connection, such as serial connection RS-232, capable of transmitting information between portable scanning device 10 and computer 200, and in particular, capable of downloading information regarding scanned indicia from portable scanning device 10 to computer 200. Cable connection 38 is not required during a scanning event. In addition, cable connection 38 is not required during a wireless transmission of information between portable scanning device 10 and computer 200, such as a radio frequency or infrared transmission.

While computer 200 is shown as a traditional laptop computer or notebook computer known in the art, it is understood that computer 200 may represent any type of microprocessor-device or may represent a single work station of a networked configuration.

Due to storage system 50, shown in FIG. 2, and further described with reference to FIGS. 3–6, portable scanning device 10 is truly a portable device. Prior art portable scanning devices require a physical/electrical connection to a computer or microprocessor during the scanning process. Prior art scanning devices do not contain a memory component capable of storing large volumes of indicia. Conversely, portable scanning device 10 of the present invention is capable of scanning and storing extremely large volumes of indicia, such as the volume discussed with reference to storage device 100. Therefore, a physical/electrical connection to a computer or microprocessor during the scanning process is not necessary. Therefore, it is understood that cable connection 38, shown in FIG. 7, is not a permanent connection. Rather, cable connection 38 is an accessory to portable scanning device 10 and/or computer 200.

Figure 8:
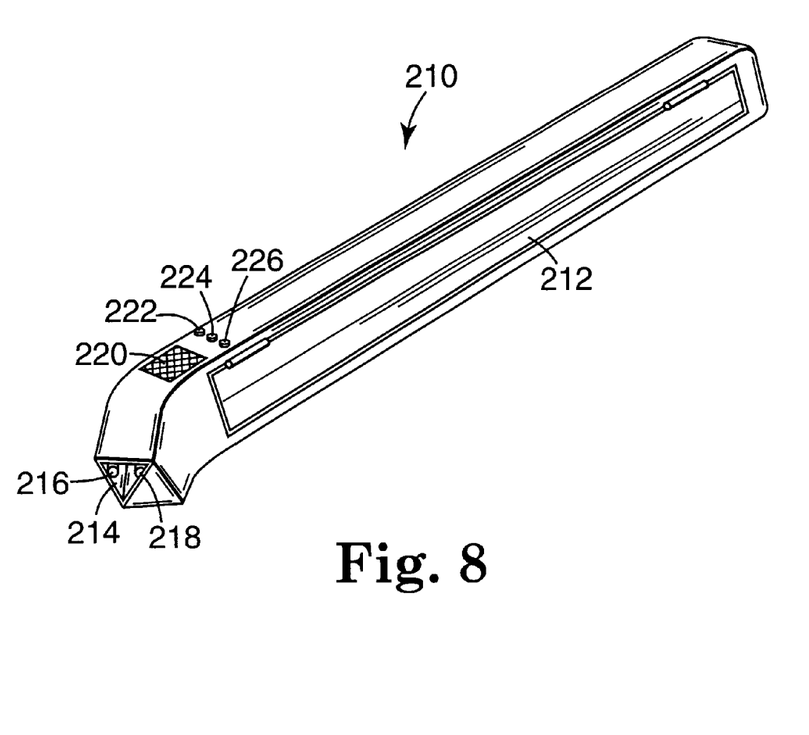
FIG. 8 is a perspective view of another embodiment of a portable scanner in accordance with the present invention.

FIG. 8 is a perspective view of another embodiment of a portable scanning device. Portable scanning device 210 represents another design of a scanning device which may incorporate a storage device, such as storage device 100 shown in FIGS. 3–6. Portable scanning device 210 includes housing 212 having an opening 214 through which a light detector receives light reflected off of indicia to be scanned. A light source, for example a pair of lights 216 and 218, may be used to direct light onto that portion of the indicia which is to be read by the scanner. In one embodiment, lights 216 and 218 may be replaced by a single or an ambient light source. As shown in FIG. 8, lights 216 and 218 are a pair of light emitting diodes.

In one embodiment, microphone 220 may be incorporated into portable scanning device 210. Microphone 220 may record comments spoken by the user of the scanner. The analog recording of the spoken comments may be transmitted into storage system 50, shown in FIG. 9. In one embodiment, portable scanning device 210 may be provided with a speech recognition processor and/or a digital recorder.

Portable scanning device 210 includes control buttons 222, 224, and 226. Control buttons 222, 224, and 226 enable the user to manipulate portable scanning device 210 such that all desirable information is properly stored within storage system 50. While only three control buttons are shown in FIG. 8, it is understood that any number of control buttons may be incorporated into portable scanning device 210 for optimal results.

Figure 9:
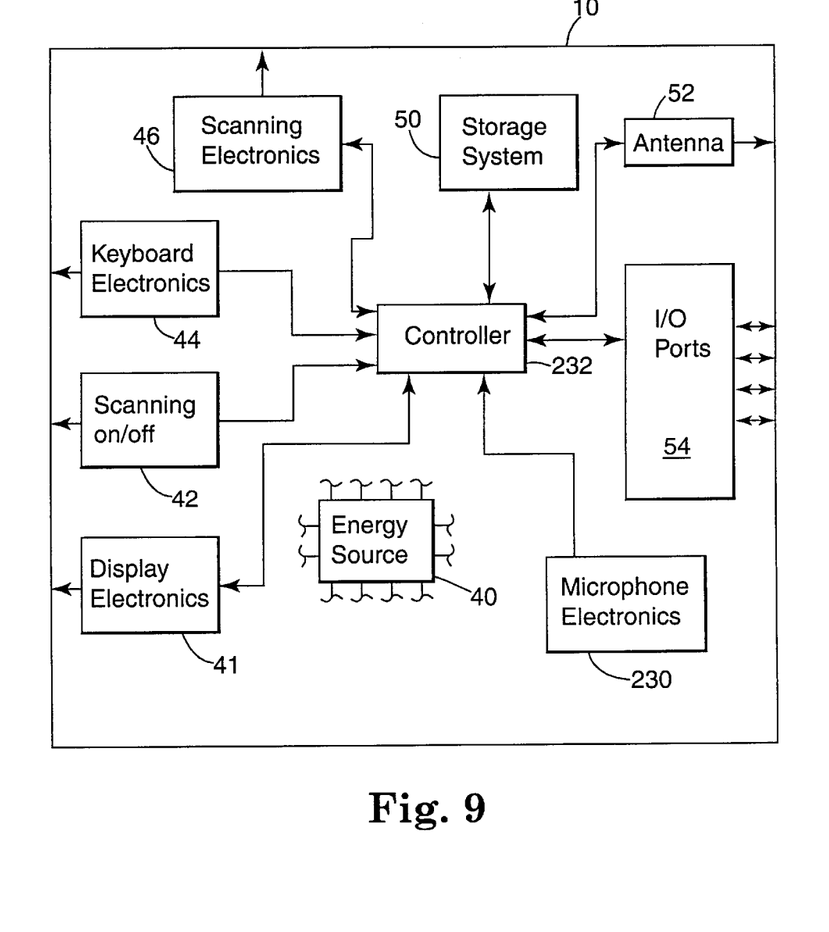
FIG. 9 is a block diagram including various electrical components of another embodiment of a portable scanning device in accordance with the present invention.

FIG. 9 is a block diagram incorporating various components of portable scanning device 210. Several components of portable scanning device 210 are similar to those components of portable scanning device 10. Therefore, similar components will be labeled as such.

Portable scanning device 210, shown in FIG. 9 includes energy source 40, display electronics 41, scanning on/off electronics 42, keyboard electronics 44, scanning electronics 46, storage system 50, antenna 52, input/output ports 54, microphone electronics 230, and controller 232. Microphone electronics 230 electrically couples microphone 220 to controller 232. Various other components of portable scanning device 210 are also connected to controller 232. In the embodiment shown in FIG. 9, controller 232 has replaced microprocessor 48 of portable scanning device 10 shown in FIG. 2. Portable scanning device 210 differs from portable scanning device 10 in that portable scanning device 210 may not manipulate indicia or information received from various components of portable scanning device 210, including scanning electronics 46. Rather, the "raw" indicia and information can only be stored within storage system 50 or forwarded to an external source via antenna 52 and/or input/output ports 54. In all other respects, portable scanning device 210 is similar to portable scanning device 10.

The present invention provides a truly portable scanning device. A physically connection is not needed between the portable scanning device of the present invention and a microprocessor or computer during the scanning process. Rather, the portable scanning device of the present invention includes a storage system capable of storing an extremely large amount of information. This information can later be downloaded to a microprocessor or computer via an electrically connection, such as a cable connection, or via a wireless transmission, such as a radio frequency or infrared transmission.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A portable apparatus for replicating images, the portable apparatus comprising:
   a housing;
   an indicia-detecting component positioned within the housing which generates a light beam directed along a light path toward the images to be replicated, and which receives reflected light from the images to produce electric signals representative of the images to be replicated; and
   an atomic resolution storage device positioned within the housing and electrically coupled to the indicia-detecting component capable of storing information regarding the images to be replicated.

2. The portable apparatus of claim 1, wherein the atomic resolution storage device further comprises:
   a field emitter fabricated by semiconductor microfabrication techniques capable of generating an electron beam current; and
   a storage medium in proximity to the field emitter and having a storage area in one of a plurality of states to represent the information stored in the storage area.

3. The portable apparatus of claim 2, wherein an effect is generated when the electron beam current bombards the storage area, wherein the magnitude of the effect depends upon the state of the storage area, and wherein the information stored in a storage area is read by measuring the magnitude of the effect.

4. The portable apparatus of claim 1, and further comprising:
   a microprocessor electrically coupled to the indicia-detecting component and the atomic resolution storage device for manipulating information regarding the images.

5. The portable apparatus of claim 1, and further comprising:
   a controller electrically coupled to the indicia-detecting component and to the atomic resolution storage device for controlling the indicia-detecting component and the atomic resolution storage device.

6. The portable apparatus of claim 1, and further comprising:
   a power on/off key for controlling energy supplied to components of the portable apparatus.

7. The portable apparatus of claim 1, and further comprising:
   a keyboard electrically coupled to the indicia-detecting component and to the atomic resolution storage device which both enables manual data entry and controls the indicia-detecting component.

8. The portable apparatus of claim 1, and further comprising:
   a display disposed on the housing for capable of displaying replicated images.

9. The portable apparatus of claim 1, and further comprising:
   a microphone electrically coupled to the atomic resolution storage device for providing voice-activated signals to the atomic resolution storage device in conjunction with the information regarding replicated images.

10. The portable apparatus of claim 1, and further comprising:
    an input/output port capable of aiding the transmission of an electrical signal between the portable apparatus and an external source.

11. The portable apparatus of claim 1, and further comprising:
an antenna capable of transmitting and receiving an electrical signal.

12. The portable apparatus of claim 11, wherein the antenna is capable of transmitting the stored information regarding the images to an external source.

13. A portable apparatus for replicating images, the portable apparatus comprising:
a housing;
an indicia-detecting component positioned within the housing capable of generating electric signals representative of the images to be replicated;
an atomic resolution storage device positioned within the housing and electrically coupled to the indicia-detecting component capable of storing information regarding the images to be replicated; and
a controller electrically coupled to the indicia-detecting component and to the atomic resolution storage device for controlling the indicia-detecting component and the atomic resolution storage device.

14. The portable apparatus of claim 13, wherein the controller is a microprocessor.

15. The portable apparatus of claim 13, and further comprising:
a power on/off key for controlling energy supplied to components of the portable apparatus.

16. The portable apparatus of claim 13, and further comprising:
a keyboard electrically coupled to the indicia-detecting component and to the atomic resolution storage device which both enables manual data entry and controls the indicia-detecting component.

17. The portable apparatus of claim 13, and further comprising:
a display disposed on the housing capable of displaying replicated images.

18. The portable apparatus of claim 13, and further comprising:
a microphone electrically coupled to the atomic resolution storage device for providing voice-activated signals to the atomic resolution storage device in conjunction with the information regarding replicated images.

19. The portable apparatus of claim 13, and further comprising:
an input/output port capable of aiding the transmission of an electrical signal between the portable apparatus and an external source.

20. The portable apparatus of claim 13, and further comprising:
an antenna capable of transmitting and receiving an electrical signal.

21. A portable apparatus for replicating images, the portable apparatus comprising:
a housing;
an indicia-detecting component positioned within the housing which generates a light beam directed along a light path toward the images to be replicated, and which receives reflected light from the images to produce electric signals representative of the images to be replicated; and
an atomic resolution storage device positioned within the housing and electrically coupled to the indicia-detecting component capable of storing information regarding the images to be replicated, the atomic resolution storage device further comprising:
a field emitter fabricated by semiconductor microfabrication techniques capable of generating an electron beam current;
a storage medium in proximity to the field emitter and having a storage area in one of a plurality of states to represent the information stored in the storage area; and
wherein an effect is generated when the electron beam current bombards the storage area, wherein the magnitude of the effect depends upon the state of the storage area, and wherein the information stored in a storage area is read by measuring the magnitude of the effect.

22. The portable apparatus of claim 21, and further comprising:
a keyboard electrically coupled to the indicia-detecting component and to the atomic resolution storage device which both enables manual data entry and controls the indicia-detecting component; and
a display disposed on the housing capable of displaying replicated images.

23. The portable apparatus of claim 21 and further comprising:
a microphone electrically coupled to the atomic resolution storage device for providing voice-activated signals to the atomic resolution storage device in conjunction with the information regarding replicated images.

* * * * *